April 25, 1933.  C. E. OGDEN  1,905,740

MEANS FOR OPERATING DRY DISK RECTIFIERS AT CAPACITIES GREATER THAN NORMAL

Original Filed May 25, 1929

Inventor.
Clarence E. Ogden,
By Arthur H. Ewald,
Attorney.

Patented Apr. 25, 1933

1,905,740

UNITED STATES PATENT OFFICE

CLARENCE E. OGDEN, OF CINCINNATI, OHIO, ASSIGNOR, BY MESNE ASSIGNMENTS, TO THE UNION SWITCH & SIGNAL COMPANY, A CORPORATION OF PENNSYLVANIA

MEANS FOR OPERATING DRY DISK RECTIFIERS AT CAPACITIES GREATER THAN NORMAL

Application filed May 25, 1929, Serial No. 366,043. Renewed January 21, 1933.

The present invention relates to dry disk rectifiers.

In the operation of dry disk rectifiers, the tendency to overheat, particularly where such rectifiers are used for heavy duty, requires some artificial means such as a forced draft, for the cooling of the disks during operation. Where a forced draft of sufficient volume can be maintained, I have found that it is possible to operate rectifier disks at capacities greatly higher than those heretofore considered normal for such disks.

The principal object of this invention is to provide a forced draft system for rectifier disks of such efficiency that the disks may be operated greatly above capacities heretofore deemed normal.

Other objects of the invention will appear from the following detailed description thereof:

Figure 1:
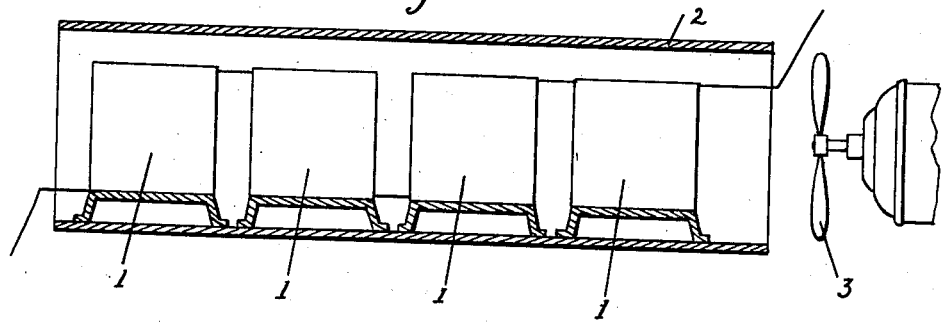
Figure 1 is a sectional view, partly diagrammatic, of a rectifier constructed in accordance with this invention.
Figure 2:
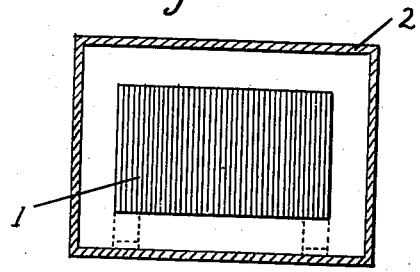
Figure 2 is an end view of said rectifier.

The numeral 1 indicates a series of units of rectifier disks stacked in accordance with a present well known construction. Said rectifier disks are mounted in a tubular channel 2 which channel is open at both ends. At one end of the channel 2 an electric fan 3 is mounted and so disposed as to force a draft at high velocity through the channel 2 and about the rectifier stacks 1 to cool the same.

In the present construction I have shown the channel 2 of rectangular construction, but it will be understood that such channel may be of any shape best to conform with the enclosed rectifier stacks.

Having thus fully described my invention, what I claim as new and desire to secure by Letters Patent is:

A device of the character specified comprising a channel open at both ends, dry disk rectifier units, mounted with their edges turned longitudinally in said channel, and means at one end of said channel for forcing a draft therethrough.

CLARENCE E. OGDEN.